United States Patent
Barrett et al.

(10) Patent No.: US 7,209,750 B2
(45) Date of Patent: Apr. 24, 2007

(54) COMMUNICATION SYSTEM, COMMUNICATION UNIT AND METHOD OF POWER SAVING THEREIN

(75) Inventors: Stephen John Barrett, Curridge (GB); Peter Legg, Wroughton (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/563,410

(22) PCT Filed: May 20, 2004

(86) PCT No.: PCT/EP2004/050877

§ 371 (c)(1),
(2), (4) Date: Jan. 4, 2006

(87) PCT Pub. No.: WO2005/006795

PCT Pub. Date: Jan. 20, 2005

(65) Prior Publication Data
US 2006/0234718 A1   Oct. 19, 2006

(30) Foreign Application Priority Data
Jul. 12, 2003   (GB) ................. 0316422.5

(51) Int. Cl.
*H04Q 7/20* (2006.01)
(52) U.S. Cl. ................. 455/453; 455/432.1; 455/452.2

(58) Field of Classification Search ................. 455/453, 455/432.1, 452.2; 370/229, 465, 230
See application file for complete search history.

(56) References Cited

U.S. PATENT DOCUMENTS

| 6,405,045 | B1 | 6/2002 | Choi et al. | |
| 6,657,954 | B1 * | 12/2003 | Bird et al. | 370/229 |
| 6,996,401 | B2 * | 2/2006 | Agin | 455/453 |
| 7,079,848 | B2 * | 7/2006 | Das et al. | 455/452.2 |

FOREIGN PATENT DOCUMENTS

| EP | 1 283 642 A | 2/2003 |
| EP | 1 289 171 A | 3/2003 |
| EP | 1 326 463 A | 7/2003 |
| WO | WO 02/056628 A | 7/2002 |

* cited by examiner

Primary Examiner—Sanh D. Phu

(57) ABSTRACT

A communication system (200) comprises a system management function (246) for managing base-site resources and system throughput of data. The system management function (246) defines a number of resources. The system management function (236), such as a radio network controller, comprises a data throughput identification function to identify one or more bottleneck resources from a sub-set of system resources involved in the system's data throughput. A method of reducing power consumption (MIPS) in a system management function (236) and a radio network controller (236) are also provided.

The identification of a bottleneck resource helps determine whether MIPS could be saved by not performing one or more QoS management algorithms, the benefit from which is reduced due to the bottleneck resource.

22 Claims, 4 Drawing Sheets

COMMUNICATION SYSTEM, COMMUNICATION UNIT AND METHOD OF POWER SAVING THEREIN

FIELD OF THE INVENTION

This invention relates to power saving in a communication unit operating in a communication system. The invention is applicable to, but not limited to saving processing power in the management of radio link admission control and/or scheduling, and/or overload or flow control, in a wireless communication system.

BACKGROUND OF THE INVENTION

Wireless communication systems, for example cellular telephony or private mobile radio communication systems, typically provide for radio telecommunication links to be arranged between a plurality of base transceiver stations (BTSs) and a plurality of subscriber units, often termed mobile stations (MSs). Base station contollers (BSCs) are provided, each BSC controlling one or more BTS.

Wireless communication systems are distinguished over fixed communication systems, such as the public switched telephone network (PSTN), principally in that mobile stations move between BTS (and/or different service providers) and in doing so encounter varying radio propagation environments.

In a wireless communication system, each BTS has associated with it a particular geographical coverage area (or cell). A particular range defines the coverage area where the BTS can maintain acceptable communications with MSs operating within its serving cell. Often these cells combine to produce an extensive coverage area.

Present day communications systems, both wireless and wire-line, have a requirement to transfer data between communications units. Data, in this context, includes speech communication. Such data transfer needs to be effectively and efficiently provided for, in order to optimise use of limited communication resources.

One such wireless communication system is the third generation partnership project (3GPP) standard supporting wide-band code-division multiple access (WCDMA) relating to the Universal mobile telecommunication system (UMTS) radio access network (RAN) known as UTRAN. The European Telecommunications Standards Institute (ETSI) is defining the 3GPP standard.

Within UMTS nomenclature, the base transceiver station (BTS) is called a node B, and a base station controller (BSC) is called a radio network controller (RNC).

Within the UTRAN, many communication resources need to be managed effectively, for example:

(i) The air interface (i.e. CDMA power and code) resource, with separate air interface resources for, say, each cell.
(ii) The backhaul resource supporting, for example limited capacity E1 links, with separate resources for, say, each Node B.
(iii) Node B hardware/software resources, for example managing the Node B's processing capability (e.g. as defined by the microprocessors, back-plane networking, etc.), may limit the throughput of data that is achievable within a cell.
(iv) RNC Hardware/software resources.

In some conventional systems, the same (or at least a similar) set of QoS management algorithms must be applied to each resource. These QoS management algorithms include:

(i) Admission control: performed when a new call enters the system/cell. Admission control has an objective of determining whether QoS will be maintained for all connections, if the new call is admitted.
(ii) Scheduling: performed every frame. Scheduling has an objective of ensuring that the number of data packets submitted for transmission will not exceed the capacity available over a short time period, such as a 10 msec. frame.
(iii) Overload control: used if the aforementioned admission control and/or scheduling mechanisms fail in their function, in order to rectify the situation. Actions might include 'call pre-emption' in which low priority calls are thrown off the system.
(iv) Flow control: This could be considered a sub-category of overload control, and is at least related to overload control. Flow control causes the source rate to be decreased in order that the system does not become congested.

Running all four of these QoS control mechanisms, for each of the many UTRAN resources, consumes a significant amount of processing power in terms of mega instructions per second (MIPS). The processing impact is felt principally in the radio network controller (RNC) in the 3GPP system, but also in the Node B.

The inventors of the present invention have recognised and appreciated that current QoS management algorithms address all resources with equal regard. Hence, there is no consideration as to their relative importance in limiting the data throughput of the network. It is possible that in some, perhaps even most, instances, a few of the UTRAN resources will be over-dimensioned with respect to the others. For these (relatively speaking) over-dimensioned resources, the MIPS consumed in performing the QoS management functions will be wasted, since other resources will represent a bottleneck in limiting a data throughput performance.

Thus, there exists a need in the field of this invention, to provide an improved QoS management methodology, particularly in cellular base-site resources in a wireless communication system (where transmission delay is a constraint), wherein the abovementioned disadvantages may be alleviated.

STATEMENT OF INVENTION

In accordance with a first aspect of the present invention, there is provided a communication system, as claimed in claim 1.

In accordance with a second aspect of the present invention, there is provided a method of reducing power consumption in a system management function (e.g. an RNC) in a communication system, as claimed in claim 15.

In accordance with a third aspect of the present invention, there is provided a 3GPP wireless communication system, as claimed in claim 23.

In accordance with a fourth aspect of the present invention, there is provided a radio network controller, as claimed in claim 24.

In accordance with a fifth aspect of the present invention, there is provided a storage medium, as claimed in claim 25.

In accordance with a sixth aspect of the present invention there is provided a radio network controller, as claimed in claim 26.

The inventive concepts of the present invention provide a mechanism for identifying the bottleneck resources in a wireless communication system. In this regard, the provision and management of access to the resources is focused on primarily the bottleneck resources. Management of other resources can be adapted accordingly, such that processing power (in terms of MIPS) can be saved. When applied to a 3GPP system, processing power in an RNC (and, to a lesser extent, a Node B) can be saved, such that the RNC (and/or Node B) could be designed to operate more efficiently and effectively. In this manner, the improved RNC (and/or Node B) is able to serve the same number of Erlangs as a similar element in a conventional system, but for less cost due to the reduced processing capabilities required.

In summary, the inventive concepts of the present invention provide a mechanism for identifying a resource bottleneck in a communication system. Additionally, the inventive concepts propose a mechanism for prioritising management algorithms to focus primarily on the bottleneck resource. Once access to the bottleneck resource performance has been managed, a reduced (if any) level of management algorithm MIPS is applied to other resources. Thus, by circumventing management of resources when no benefit can be gained due to the bottleneck limitations incurred by another resource, processing power can be saved.

BRIEF DESCRIPTION OF THE DRAWINGS

Exemplary embodiments of the present invention will now be described, with reference to the accompanying drawings, in which.

DESCRIPTION OF PREFERRED EMBODIMENTS

In the context of the present invention, any reference to power saving should be viewed as encompassing saving of processor resources, for example in terms of mega instructions per second (MIPS).

The preferred embodiments of the present invention selectively apply QoS algorithms to one or more system resources, but notably not all system resources to the same degree. The preferred application of the present invention is a 3GPP wireless communication system architecture. In this regard, the present invention introduces a concept of an 'active set'. The 'active set' is a list of the bottleneck UTRAN resources for which a substantial number, and preferably all, QoS management algorithms will be run. The QoS management algorithms in this context preferably comprise: scheduling and admission control.

In summary, the inventive concepts of the present invention provide a mechanism for identifying a resource bottleneck in a communication system. A mechanism for prioritising the QoS management algorithms is proposed, to focus on the bottleneck resource. Once the bottleneck resource performance has been optimised, a reduced (if any) level of management is applied to the other resources. By avoiding running management algorithms for resources when no benefit can be gained due to the bottleneck limitations incurred by another resource, processing power can be saved.

Figure 1:
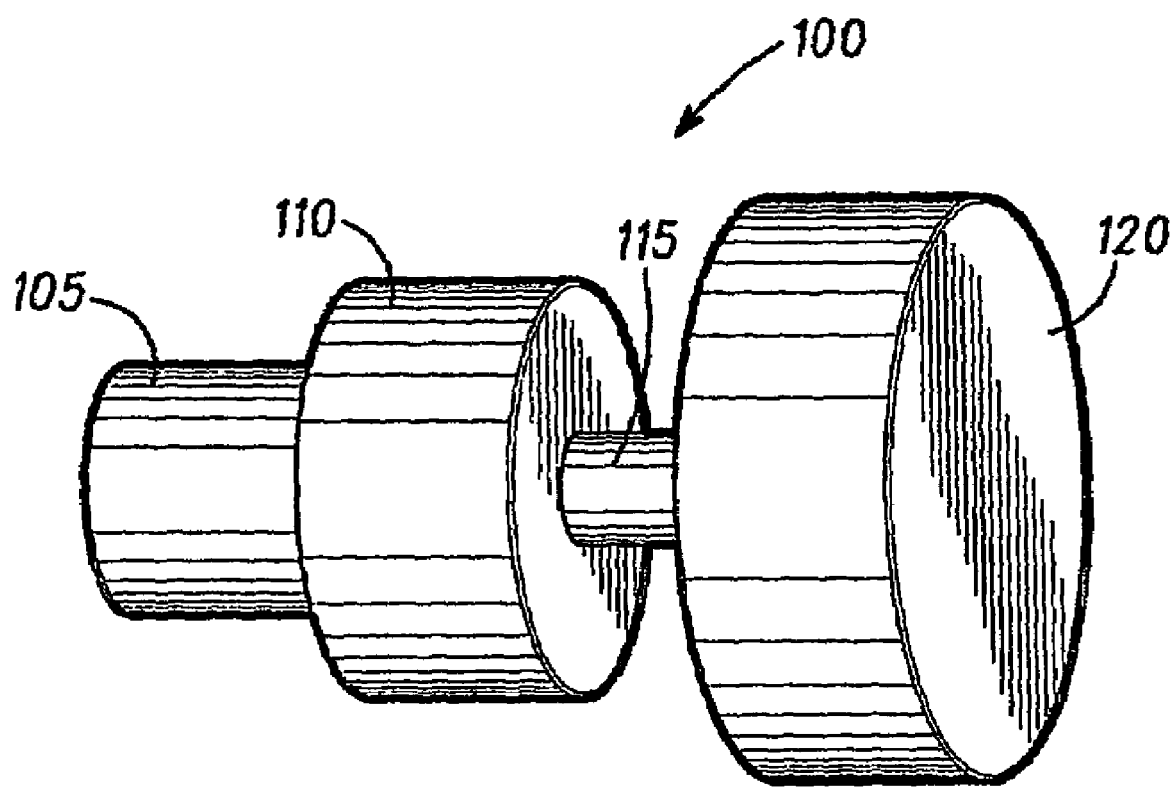
FIG. 1 illustrates a schematic diagram of an example of a throughput capability of each of the UTRAN resources, determined and responded to according to a preferred embodiment of the present invention.

Referring now to FIG. 1, a schematic diagram 100 illustrates a throughput capability of each of the UTRAN resources. In this illustration, the throughout of each resource may be visualised as a pipe of a given size. In the illustration of FIG. 1, the $I_{ub}/I_{ur}$ backhaul resource 115 is clearly the bottleneck in the delivery of communication services as this resource has the smallest diameter (data throughput) pipe, when compared to the RNC or Node B hardware/software resource 105, 110, or the air-interface resource 120.

In accordance with the preferred embodiments of the present invention, once the 'bottleneck' has been identified, the efficiency improvement algorithms such as running admission control and scheduling algorithms are applied to this 'bottleneck' resource alone. In this manner, the 'system' is able to save on its processing requirements, when compared to current systems, and still provide the same level of service.

Figure 2:
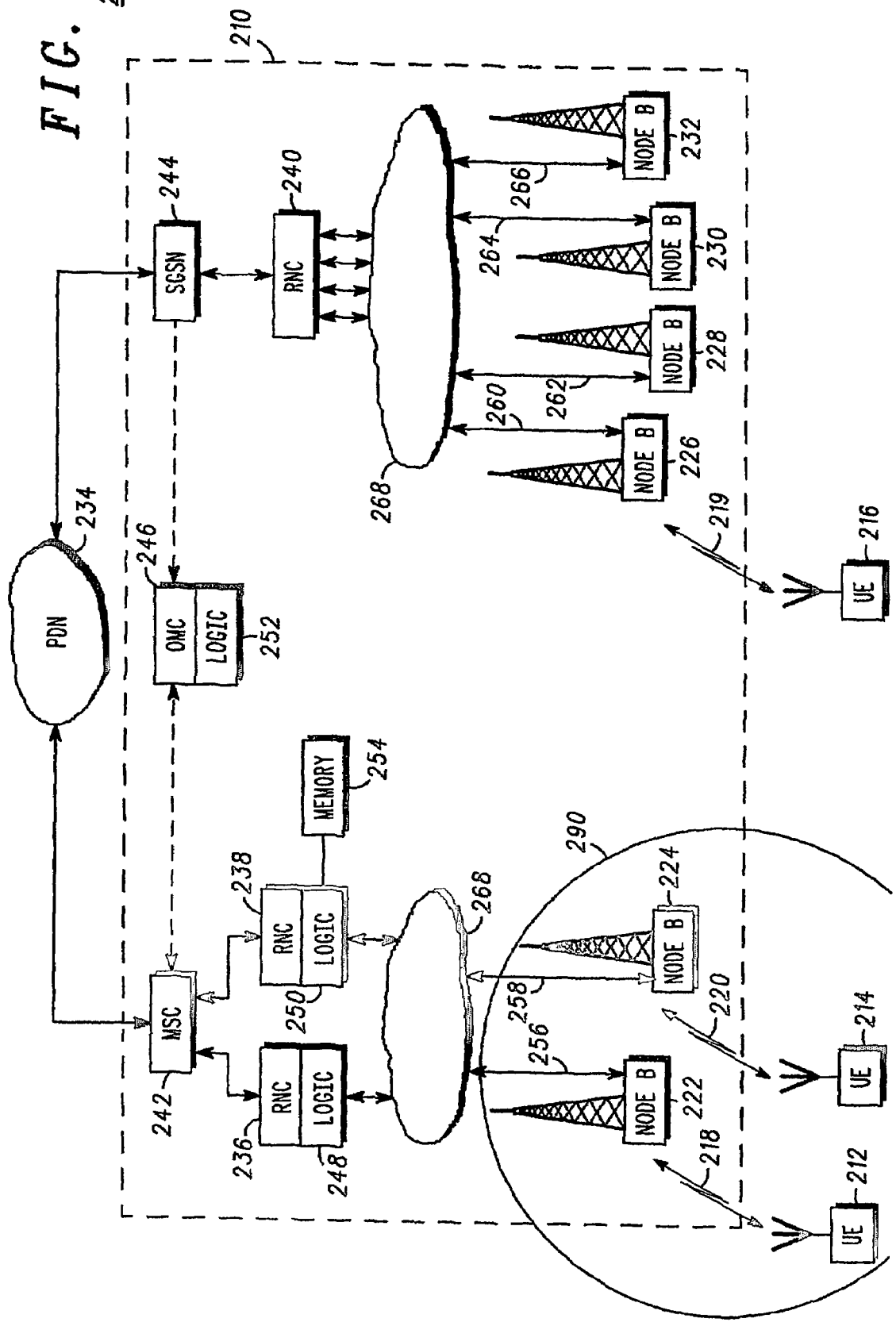
FIG. 2 shows a block diagram of a 3GPP cellular radio communications system adapted to support the various inventive concepts of a preferred embodiment of the present invention.

Referring now to FIG. 2, a cellular-based telephone communication system 210 supporting a Universal Mobile Telecommunications Standard (UMTS) air-interface is illustrated, in outline, in accordance with a preferred embodiment of the invention. In particular, the described embodiment relates to the Third Generation Partnership Project (3GPP) specification for wide-band code-division multiple access (WCDMA) standard relating to UTRAN.

A plurality of subscriber units 212–216 communicates over the selected air-interface 218–221 with a plurality of Node Bs 222–232. A limited number of subscriber units 212–216 and Node Bs 222–232 are shown for clarity purposes only. Each Node B 222–232 contains one or more transceiver units and communicates with the rest of the cellular system infrastructure via $I_{ub}$ interface 235. The Node Bs 222–232 may be connected to external networks, for example, the public-switched telephone network (PSTN) or the Internet 234 through Radio Network Controller stations (RNC) 236–240 and any number of mobile switching centers (MSCs) 242 and Serving GPRS Support Nodes (SGSN) 244.

Each RNC 236–240 may control one or more Node Bs 222–232. Each MSC 242 (only one shown for clarity purposes) provides a gateway to the external network 234, whilst the SGSN 244 links to external packet data networks.

The Operations and Management Center (OMC) 246 is operably connected to RNCs 236–240 and Node Bs 222–232 (shown only with respect to Node B 226 and Node B 228 for clarity), and administers and manages functions within the cellular telephone communication system 210, as will be understood by those skilled in the art.

In accordance with a preferred embodiment of the present invention, one or more RNCs 236–240 has been adapted to include a bottleneck detector function. The functionality of the bottleneck detector function is described below, particularly with regard to the decision process of adding an identified bottleneck resource to an 'active set', or removing an identified bottleneck resource from an 'active set'.

In addition, a scheduler typically run in the one or more RNCs 236–240 to schedule the transmission of data packets has also been adapted. The scheduler is operably coupled to the bottleneck detector function and has been adapted to schedule data packets according to a determined prioritisation. In particular, the data packets are scheduled according to whether a bottleneck resource, as identified by the RNC, will allow the data packet to pass therethrough.

Furthermore, in the preferred embodiment of the present invention, an admission control function/algorithm typically run in the one or more RNCs 236–240 has also been adapted. The admission control function/algorithm is operably coupled to the bottleneck detector function and has been adapted to admit a user requesting access according to a determined prioritisation. In particular, the admission control function/algorithm is based on whether a bottleneck resource, as identified by the RNC, will support the transmissions of the requesting user.

More generally, one or more RNCs effectively perform an improved system management function, where the RNCs are programmed, in any suitable manner, according to the preferred embodiment of the present invention. For example, new apparatus may be added to a conventional communication unit (for example RNC 236). Alternatively existing parts of a conventional communication unit may be adapted, for example, by reprogramming one or more processors therein. As such the required adaptation (to introduce a bottleneck detector or adapt a scheduler and/or an admission control function) may be implemented in the form of processor-implementable instructions stored on a storage medium, such as a floppy disk, hard disk, programmable read only memory (PROM), random access memory (RAM) or any combination of these or other storage media.

Although the preferred embodiment of the present invention is described with reference to a bottleneck detector and improvements to the efficient usage of, say, one or more QoS management algorithms such as a scheduler and/or an admission control function/algorithm relating to an RNC's operation, it is envisaged that these functions/algorithms may reside in other network elements. For example, it is envisaged that the inventive concepts in adapting the system's performance in response to a detected bottleneck resource may be implemented daily or weekly. In this regard, the aforementioned functions/algorithms may be located in, say, the OMC 246, in contrast to the dynamic adaptation provided when the aforementioned functions/algorithms are preferably located in the RNC.

It is also within the contemplation of the invention that such aforementioned functions/algorithms may reside in other network elements, or alternatively be distributed amongst two or more such network elements in wireless communication systems. Furthermore, alternative radio communication architectures could benefit from the inventive concepts described herein, and the inventive concepts are not considered as being limited to the specific configuration illustrated in FIG. 2.

In a first embodiment of the present invention, the 'active set' is configured to include all UTRAN resources. The QoS algorithms are optimised to exploit the findings of the bottleneck detector in the RNC. In this first embodiment, all resources are considered within the 'active set'. The RNC determines the likelihood of each resource being a data throughput bottleneck, which limits the data throughput performance of the system. The determination is preferably made using one of the following measurements, which are further described later:

(i) The frequency at which the overload control function is initiated; or
(ii) Through measurements of the percentage utilisation of the resource.

Let us now consider how the respective QoS mechanisms have been adapted to support the inventive concepts of the present invention.

Scheduler Algorithm

In the preferred embodiment of the present invention, the scheduler algorithm in the UTRAN runs, for example, every radio frame and schedules all the queued data packets for transmission in the next frame.

A known scheduler operation takes a data packet at a head of a data queue and determines, in a serial, per-data packet manner, whether the introduction of that data packet will overload any of a number of resources. All resources are checked in the known scheduler operation, with equal importance allocated to the resources. The resources could be, for example, code consumption, power consumption, backhaul bit-rate consumption, etc.

If the scheduler determines that the introduction of the data packet will overload a particular resource, the scheduler terminates the scheduling operation. Alternatively, the scheduler operation is terminated when the data packet queue is exhausted.

A problem with this known approach is that unnecessary checks are made for every data packet, checking per-data packet consumption for each and every resource. The inventors of the present invention have identified this as wasteful, particularly in scenarios where the resource is plentiful. For example, a downlink scheduler may be code limited, i.e. it stops scheduling when the code resource is exhausted. When the scheduler stops, the power and backhaul utilisation may be very low, say at 50%, but a determination has been made as to the consumption of these resources for every data packet scheduled. Thus, this adds unnecessary loading onto the scheduler processor.

Figure 3:
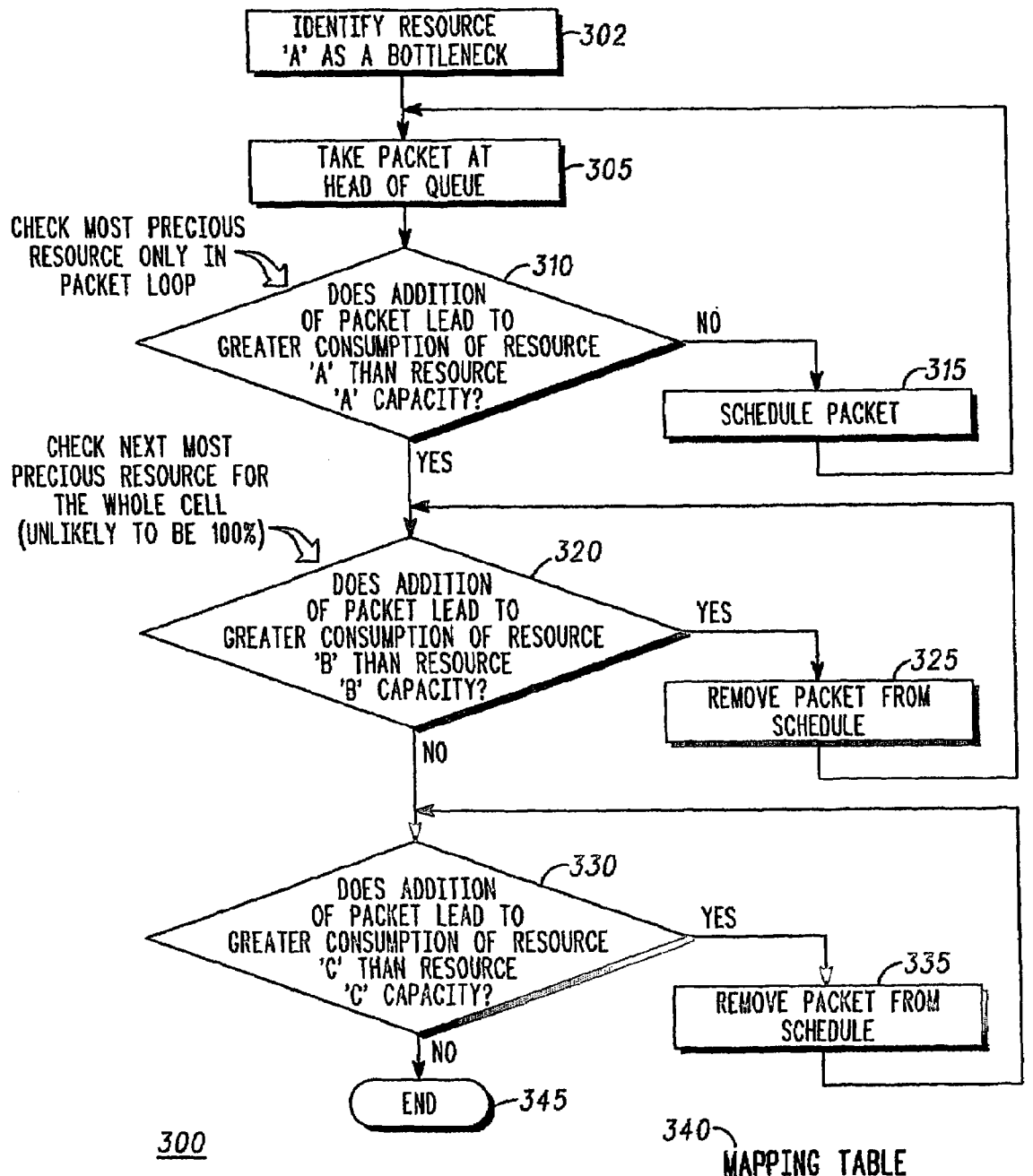
FIG. 3 illustrates a flowchart of a scheduler scheduling data packets for transmission dependent upon a number of resources used in the transmission in accordance with the inventive concepts of a preferred embodiment of the present invention.

The improved scheduler operation, adapted in accordance with a preferred embodiment of the present invention, is illustrated in the flowchart 300 of FIG. 3. First, the RNC identifies a primary bottleneck resource, for example resource 'A', in step 302. Then, the scheduler operation commences by taking a data packet at the head of a queued data stream, as shown in step 305.

In the preferred embodiment of the present invention, a determination is first made as to the resource that is most likely to limit the data packet throughput, i.e. the resource that would typically reach 100% utilisation before the others. Thus, this (bottleneck) resource is allocated the highest priority in the scheduling determination process. The limitation imposed by the bottleneck resource, termed resource 'A', is determined in step 310. Notably, the scheduler assesses the impact of each received data packet only against this resource 'A', as data packets are added to the schedule, as in step 315. This process of introducing further data packets from the queue is continued until resource 'A' is fully utilised.

Thereafter, once resource 'A' is exhausted, the process checks the consumption of the second resource, 'B', as shown in step 320. It is expected that resource 'B' would be the next highest priority resource, i.e. the second worst bottleneck identified from the number of resources. Resource 'B' is therefore likely operating below full utilisation at this point, as resource 'A' is typically the limiting resource. However, this relationship may not necessarily be true, so preferably the remaining resources are checked. If resource 'B' is fully utilised, data packets are removed from the schedule, in step 325 until the utilisation of resource 'B'<=100%. Notably, consumption of resource 'A' will now be <100%.

In an enhanced embodiment of the present invention, an intelligent decision is made as to which data packet(s) is/are removed from the schedule. In this context, it is envisaged that it would be better to remove data packets that have the greatest use of resource 'B'. For example, if resource 'B' is backhaul bandwidth, the data packets that consume the greatest size (in bits) are removed from the schedule.

This process continues, as shown for example in steps 330, 335, taking the next highest priority resource until a schedule is found for which all resources are at <=100% usage. The scheduler process is then complete, as shown in step 345.

It is clear that the above scheduling algorithm may involve as few as 1/n process steps of the known consumption-checking algorithm, where n is the number of resources to be checked. Furthermore, as shown in the mapping table, the bottleneck detector has employed, in step 340, a 'mean utilisation' as a metric to order/prioritise the respective resources. In this manner, the bottleneck resource is the resource that has the highest percentage mean utilisation. It is envisaged that in other embodiments a peak or a variable or fixed percentile loading could be used.

Admission Control Algorithm

Figure 4:
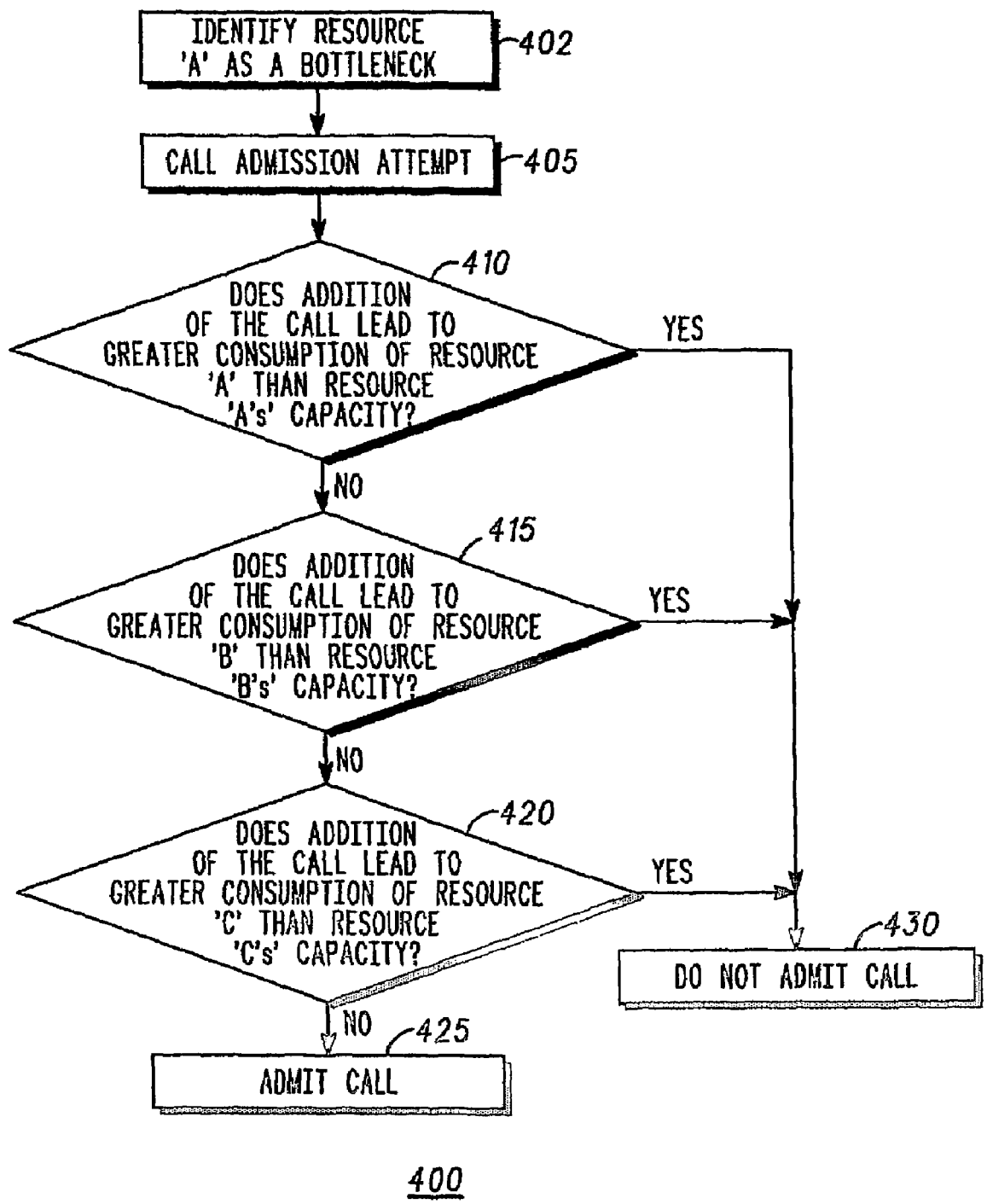
FIG. 4 illustrates a flowchart of admission control for transmission of data packets dependent upon a number of resources used in the transmission according to a preferred embodiment of the present invention.

Admission control is a process for determining whether, or not, resources are to be granted to a requesting communication device. Inefficient operation of admission control is possible when the admission control algorithm does not examine, in an optimum sequence, the admission request against the resources that are currently available. A preferred mechanism for implementing admission control is illustrated in the flowchart 400 of FIG. 4.

The preferred mechanism commences in step 402 with the RNC identifying resource 'A' as a primary bottleneck resource. The RNC receives a request, in step 405, of a call admission attempt. A determination is then made as to whether the admission of the call requires allocation of resource; say resource 'A' in step 410, which is greater than the available capacity of resource 'A'. If the requested amount of resource 'A' is greater than the capacity of resource 'A' the call is not admitted, as shown in step 430. Resource 'A' has been previously identified by the RNC as being the likely bottleneck resource in terms of data throughput. Consequently, resource 'A' is allocated the highest priority in the admission control process.

If resource 'A' has sufficient capacity to accommodate the call in step 410, a determination is made as to whether the requirements of a second resource, say resource 'B' in step 415, is greater than the capacity provided by resource 'B'. If the requested amount of second resource 'B' is greater than the available capacity of resource 'B', the call is not admitted, as shown in step 430.

Similarly, if resource 'B' has sufficient capacity to accommodate the call in step 415, a determination is made as to whether the requirements of a third resource, say resource 'C' in step 420, is greater than the available capacity of resource 'C'. If the requested amount of resource 'C' is greater than the available capacity provided by resource 'C' the call is not admitted, as shown in step 430. This process continues until all resources have been checked, at which time the call is admitted, as shown in step 425.

In accordance with the preferred embodiment of the present invention, a tracking process is introduced to count a failure rate of admission attempts for a particular resource. If the proportion of admission failures on a certain resource, compared to the total number of admission requests as measured over some preceding time interval, exceeds a given threshold, then the resource should be moved further up the list of resources to be checked. In this manner, the resource will be checked earlier in future. Furthermore, in the same manner as the above scheduling operation, the resources 'A', 'B' and 'C' (and any others) are prioritised in an order of the likelihood of an admission failure. This ordering process is preferably based on the failure count statistics.

In this manner, the number of checks required for a call admission attempt that will ultimately fail is minimised, i.e. the ordering of the resource checks has been configured such that the admission control process would likely fail at the first step of checking resource 'A'.

Advantageously, this algorithm delivers a significant benefit during periods of high load, when blocking is occurring regularly and when the RNC processors are already under a heavy load stress.

In accordance with a second embodiment of the present invention, the active set is deemed a subset of the UTRAN resources. In this context, the reduction in MIPS is achieved by performing QoS management only on those resources in the active set, i.e. the one or more resources that have been identified as bottleneck UTRAN resources. It is noteworthy that, in the second embodiment, overload detection and reaction mechanisms are in place for all UTRAN resources and will be in an 'active' operational mode all of the time.

Also, in this second embodiment, the active set of UTRAN resources most preferably is configured to be adaptable in that the resources could be dynamically added to, or removed from, the active set. Preferably, at cell set-up (i.e. Node B power on) all UTRAN resources will be configured to be in the active set.

Thereafter, it is envisaged that a UTRAN resource will be added to the active set list if, over some preceding time interval or over some preceding number of scheduling/admission control events, one or more overload alarms were raised corresponding to that particular UTRAN resource.

In a similar manner, it is envisaged that a UTRAN resource will be removed from the active set if a limitation due to that particular resource has NOT been logged as one of the reasons that prevented a packet to be scheduled, or a call to be admitted. Again, this determination is carried out over some preceding time interval or over some preceding number of scheduling and/or admission control events. In addition, it is preferred that at least one UTRAN resource remains in the 'active set' list. In this case, for the one remaining UTRAN resource in the active set list, all the relevant QoS mechanisms (admission control, scheduling, flow control, overload control) will be applied.

TABLE 1

Indication of UTRAN resources versus QoS algorithm for one 'active set'

| UTRAN resources | UTRAN resource in active set? | Perform admission control for the resource? | Perform scheduling for the resource? | Perform flow control for the resource? |
|---|---|---|---|---|
| RNC hardware/software | Yes | Yes | Yes | Yes |
| Backhaul resource (Iub, Node B #1) | Yes | Yes | Yes | Yes |
| Backhaul resource (Iub, Node B #2) | No | No | No | No |

TABLE 1-continued

Indication of UTRAN resources versus QoS algorithm for one 'active set'

| UTRAN resources | UTRAN resource in active set? | Perform admission control for the resource? | Perform scheduling for the resource? | Perform flow control for the resource? |
|---|---|---|---|---|
| Backhaul resource (Iur, RNC n–RNC p) | Yes | Yes | Yes | Yes |
| Backhaul resource (Iur, RNC n–RNC q) | No | No | No | No |
| Node B hardware/ software (Node B#1) | No | No | No | No |
| Node B hardware/ software (Node B#2) | Yes | Yes | Yes | Yes |
| Air interface resource (Cell #1) | Yes | Yes | Yes | Yes |
| Air interface resource (Cell #2) | No | No | No | No |

If a UTRAN resource is in the active set then all QoS management functions are run. Note that in a practical system there will be many more UTRAN resources than the limited number shown in Table 1.

In an enhanced feature of the second embodiment of the present invention, an active set is associated with each of the QoS management mechanisms: admission control, scheduling. The particular QoS mechanism is 'run' only for those UTRAN resources in the active set. Preferably, each QoS management mechanism is configured to operate on their respective timescale, for example:

(i) An admission control function may be configured to manage an average number of resources on a relatively long time scale (say, in terms of seconds), whereas (ii) A scheduler may manage schedule resources on a shorter timescale (say, of the order of 10 msec).

It is also envisaged that different overload control mechanisms can be triggered over different timescales. In the case of some resources (in this example we will consider the air interface), the notional resource pipe size may be subject to relatively large fluctuations on a short timescale, whilst being reasonably constant over a longer timescale. Hence, for example, it might be important to perform air interface scheduling, whilst it might not be necessary to perform air interface admission control.

TABLE 2

Indication of UTRAN resources versus Qos algorithm with one 'active set' per QoS algorithm

| UTRAN resource | UTRAN resources in "admission control" active set | UTRAN resources in "scheduling" active set | UTRAN resources in "flow control" active set |
|---|---|---|---|
| RNC hardware/ software | Yes | Yes | Yes |
| Backhaul resource | Yes | Yes | No |
| Node B hardware/ software | No | Yes | No |
| Air interface resource | No | No | No |

Table 2 indicates three active sets for this enhancement to the second embodiment, one for each QoS mechanism. Again, in a practical system, there will be many more UTRAN resources than the limited number shown in Table 2.

Alternatively, one could define the set of QoS mechanisms that manages resources on a given timescale. Then, for each timescale, it is possible to define the UTRAN resources for which the applicable QoS mechanisms will be applied, as shown below in Table 3.

TABLE 3

Indication of UTRAN resources versus QoS algorithm with timer implications

| UTRAN resource | UTRAN resources in "10 ms QoS mgmt timescale" active set scheduling applied | UTRAN resources in "100 ms QoS mgmt timescale" active set flow control applied | UTRAN resources in a 1 sec. Qos mgmt timescale active set. Admission control/ overload control applied |
|---|---|---|---|
| RNC hardware/ software | Yes | Yes | Yes |
| Backhaul resource | Yes | Yes | No |
| Node B hardware/ software | No | Yes | No |
| Air interface resource | No | No | No |

Table 3 illustrates three active sets, one for each QoS management timescale, where different QoS mechanisms are applied for each timescale.

In this enhancement of the second embodiment, it is envisaged that a UTRAN resource may be added to the active set list, for a QoS mechanism/QoS management timescale, if an overload control alarm is triggered for that resource. The measurement is preferably performed over the corresponding QoS management time period. Similarly, a UTRAN resource may be removed from the active set list for a given QoS mechanism/QoS management timescale if a limitation in the resource has NOT been logged as one of the reasons that prevented a packet to be scheduled or a call to be admitted. Again, it is envisaged that this determination is performed over some preceding time interval or over some preceding number of scheduling and/or admission control events.

Furthermore, the above mechanisms for adding resources to, or removing resources from, the active list would require that there had been no overload alarm raised corresponding to that particular UTRAN resource over the preceding time interval or number of scheduling and/or admission control events. In addition, it is preferred that at least one UTRAN resource remains in the 'active set' list, for that QoS management mechanism or the QoS management mechanism timescale.

In a yet further enhancement of the second embodiment, it is envisaged that reliance on overload control alarm triggering as a mechanism for modifying the active set could be reduced or removed. The alternative approach could be to perform regular measurements of the loading on each of the resources, and to make add or drop decisions on the basis of the current loading. Such a mechanism will beneficially reduce the (unwanted) occurrence of overload.

For simplicity reasons only, let us consider a case where there is just one active set. At cell set-up (i.e. Node B power on), all UTRAN resources will be in the active set. Regular measurements of the load on each of the UTRAN resources are then performed. It is envisaged that the load measurement could be averaged or could, for example, be the $x^{th}$ percentile. Either way, in this example, measures of load would be expressed as a percentage of the total UTRAN resource capacity.

Thus, a UTRAN resource will be removed from the active set if, for example, the UTRAN resource load is less than, say, Threshold_1 and has been for some time period T_1. Furthermore, a UTRAN resource will be added to the active set list if, for example, the UTRAN resource load is greater than, say, Threshold_2, and has been for some time period T_2.

It is also within the contemplation of the present invention that any combination of the above inventive concepts could be employed. For example, it is envisaged that there could be an active set per QoS mechanism or per QoS mechanism timescale. In this regard, say at regular intervals, the particular loading as measured over certain timescales (e.g. 10, 100 or 1000 msec's) is determined for all UTRAN resources. If a certain loading criteria (threshold) is met, then a UTRAN resource will be added to, or removed from, the active set list.

Furthermore, it is envisaged that whenever an overload on a resource is identified, the resource could be immediately added to the active set.

It is also within the contemplation of the present invention that a decision on the specific QoS management mechanisms to apply for a given resource could be made 'off-line'. In this context, the decision may be encoded as an OMC parameter. Off-line dimensioning calculations and/or experience through trial and error and/or expert systems could be used to as part of this process.

Although the preferred embodiment of the present invention has been described with reference to a bottleneck identifier in the context of a UTRAN 3GPP system, it is envisaged that the inventive concepts are equally applicable to other telecommunication systems, wireless or wire line, including for example core networks or backbone networks.

For completeness, it is worth clarifying how the reduced complexity (power in terms of MIPS) requirement may be exploited in practice. However, a skilled artisan would appreciate that the inventive concepts described herein can be exploited in a number of other ways, and therefore the inventive concepts are not limited to the mechanisms described below.

When a wireless communication network is currently installed, it is necessary that an RNC has a processing capability approximately equal to that deemed necessary to support the worst-case scenario. In this regard, the RNC needs to be configured sufficiently to accommodate all UTRAN resources. This typically results in some inefficiency on initial network installation, since it is to be expected that typically the RNC would be under-utilised in some respects. Furthermore, as the network load increases and more Node Bs are added, the inefficiencies of the RNC processor increase.

Therefore, it will be understood that the improved QoS management methodology where the bottleneck detection algorithm is running, as described above, provides at least the following advantages:

(i) Decisions on whether to add additional RNC processor resource can be taken at the OMC by monitoring the load on the RNC's processor resource.

(ii) The rate at which RNC cards would have to be added in order to support a higher network load would be reduced.

(iii) Where some of the QoS processing is performed in the Node B (e.g. hardware/software admission control), the technique will also result in a reduction in signalling and call set-up delays on the occasions where the Node B hardware/software resource is not a bottleneck resource.

Whilst the specific and preferred implementations of the embodiments of the present invention are described above, it is clear that one skilled in the art could readily apply variations and modifications to the preferred embodiments that fall within the inventive concepts.

Thus, a communication system and method for reducing power consumption in a communication system have been provided wherein the aforementioned disadvantages of the prior art have been substantially alleviated.

The invention claimed is:

1. A communication system comprising a system management function for managing base-site resources and system throughput of data, the system management function configured to identify a number of resources, wherein the system management function comprises:
   a throughput identification function to identify one or more bottleneck resources from a sub-set of system resources involved in the system throughput;
   means for applying selectively at least one quality of service process selected from a group of scheduling and admission control, to the identified one or more bottleneck resources, based on the identification of the one or more bottleneck resources; and
   means for prioritizing at least one of the one or more bottleneck resources and other resources from the sub-set of system resources, by the system management function, with a bottleneck resource being allocated a high priority when selectively applying at least one quality of service process.

2. The communication system according to claim 1, wherein the bottleneck resource is identified as a bottleneck resource using at least one of the following parameters:
   (i) A frequency at which an overload control function is initiated for the resource; or and
   (ii) Measurement of a resource's utilisation.

3. The communication system according to claim 1, wherein said system management function is operably coupled to a scheduler for scheduling data packets for transmission, such that the data packets are added to, or removed from a data stream for transmission based on an availability capacity of the identified one or more bottleneck resources or other resource from the sub-set of resources.

4. The communication system according to claim 1, wherein the system management function is operably coupled to an admission control function for admitting call requests to the communication system such that the admission control function employs a tracking process to count a failure rate of admission attempts for a particular resource.

5. The communication system according to claim 4, wherein the bottleneck resource is identified based on said failure rate count.

6. The communication system according to claim 1, wherein the system management function only applies one or more quality of service processes to the identified one or more bottleneck resources.

7. The communication system according to claim 1, wherein the throughput identification function identifies a bottleneck resource by detection of an alarm corresponding to a further resource and in response to the alarm the system management function adds the further resource to a list of one or more bottleneck resources.

8. The communication system according to claim 7, wherein the detection of the alarm includes at least one of the group of; an overload alarm, the detection is performed over a time interval, the detection is performed over a number of scheduling events, and the detection is performed over a number of admission control events.

9. The communication system according to claim 1, wherein the system management function resource receives a number of loading measurements on a number of the resources, and in response to the measurement(s) adds a percentage of a resource to, or removes a percentage of a resource from, a list of one or more bottleneck resources when a loading exceeds or falls below a loading threshold over a particular time period.

10. The communication system according to claim 1, wherein the communication system is a 3GPP wireless communication system and the system management function is a radio network controller.

11. The communication system according to claim 10, wherein, the resources comprise at least one:
   (i) A Radio network controller resource (105);
   (ii) A Node B hardware/software resource (110);
   (iii) An $I_{ub}/I_{ur}$ backhaul resource (115); and
   (iv) An air-interface resource (120).

12. A method of reducing processing power consumption in a system management function in a communication system, the method comprising the steps of:
   identifying a number of resources that affect data throughput in the communication system;
   identifying one or more bottleneck resources from a sub-set of system resources involved in the system throughput; and
   applying selectively one or more quality of service processes selected from a group of scheduling and admission control, to the identified one or more bottleneck resources, based on the identification of the one or more bottleneck resources; and
   prioritizing at least one of the one or more bottleneck resources and other resources from the sub-set of system resources, by the system management function, with a bottleneck resource being allocated a high priority when selectively applying at least one quality of service process.

13. The method of reducing processing power consumption in a system management function according to claim 12, the method further comprising a step of:
   identifying a resource capacity of a number of the resources to identify the bottleneck resource.

14. The method of reducing processing power consumption in a system management function according to claim 12, the method further comprising the step of:
   scheduling data packets for transmission, such that the data packets are added to, or removed from a data stream for transmission based on the bottleneck resource.

15. The method of reducing processing power consumption in a system management function according to claim 14, the method further comprising the step of:
   performing per-cell checks on all resources that are not the bottleneck resource to identify whether further data packets are to be scheduled.

16. The method of reducing processing power consumption in a system management function according to claim 12, the method further comprising the step of:
   counting a failure rate of admission attempts for a particular resource to identify the bottleneck resource.

17. The method of reducing processing power consumption in a system management function according to claim 12, the method further comprising the steps of:
   detecting an alarm corresponding to a resource; and
   adding, in response to the alarm, the resource to a list of one or more bottleneck resources.

18. The method of reducing processing power consumption in a system management function according to claim 12, the method further comprising the steps of:
   receiving a number of loading measurements related to a number of the resources, and
   adding, in response to said measurement(s), a resource to a list of one or more bottleneck resources when a loading measurement exceeds a loading threshold over a particular time period; or
   removing a resource from a list of one or more bottleneck resources resource when a loading measurement falls below a loading threshold over a particular time period.

19. A radio network controller managing base-site resources and system throughput of data, the radio network controller identifying a number of resources, wherein the radio network controller is comprises:
   a throughput identification function to identify one or more bottleneck resources from a sub-set of the number of system resources involved in said system throughput;
   means for applying selectively at least one quality of service process selected from a group of scheduling and admission control, to the identified one or more bottleneck resources, based on the identification of the one or more bottleneck resources; and
   means for prioritizing at least one of the one or more bottleneck resources and other resources from the sub-set of system resources, by the system management function, with a bottleneck resource being allocated a high priority when selectively applying at least one quality of service process.

20. The radio network controller according to claim 19, wherein the throughput identification function identifies a bottleneck resource by detection of an alarm corresponding to a further resource, and in response to the alarm radio network controller adds the further resource to a list of one or more bottleneck resources.

21. The radio network controller according to claim 20, wherein the detection of the alarm includes at least one of a group of overload alarms wherein, the detection is performed over a time interval, the detection is performed over a number of scheduling events, or the detection is performed over a number of admission control events.

22. The radio network controller according to claim 19, wherein the throughput identification function receives a number of loading measurements on a number of the resource, and in response to the measurement(s) the radio network controller adds a percentage of a resource to, or removes a percentage of a resource from, a list of one or more bottleneck resources when a loading exceeds or falls below a loading threshold over a particular time period.

* * * * *